United States Patent
Borntrager et al.

(10) Patent No.: US 9,168,908 B2
(45) Date of Patent: Oct. 27, 2015

(54) METHOD FOR ACTUATING A STARTING PROCESS

(75) Inventors: Kai Borntrager, Langenargen (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 736 days.

(21) Appl. No.: 13/501,507

(22) PCT Filed: Oct. 29, 2010

(86) PCT No.: PCT/EP2010/066427
§ 371 (c)(1),
(2), (4) Date: Jul. 23, 2012

(87) PCT Pub. No.: WO2011/054744
PCT Pub. Date: May 12, 2011

(65) Prior Publication Data
US 2012/0322612 A1     Dec. 20, 2012

(30) Foreign Application Priority Data
Nov. 4, 2009   (DE) .......................... 10 2009 046 367

(51) Int. Cl.
*B60W 10/08*     (2006.01)
*B60W 10/02*     (2006.01)
(Continued)

(52) U.S. Cl.
CPC ................. *B60W 10/02* (2013.01); *B60K 6/48* (2013.01); *B60L 1/003* (2013.01); *B60L 11/123* (2013.01); *B60L 11/14* (2013.01); *B60L 15/2081* (2013.01); *B60W 10/08* (2013.01); *B60W 30/18027* (2013.01); *B60W 30/18118* (2013.01); *B60L 2210/40* (2013.01); *B60L 2220/14* (2013.01); *B60L 2240/12* (2013.01); *B60L 2240/421* (2013.01); *B60L 2240/423* (2013.01);
(Continued)

(58) Field of Classification Search
CPC ................. B60W 10/02; B60W 10/08; B60W 30/18018; B60W 2520/06; B60W 2710/027; B60W 2710/083
See application file for complete search history.

(56) References Cited

U.S. PATENT DOCUMENTS

| | | |
|---|---|---|
| 5,735,770 A | 4/1998 | Omote et al. |
| 2006/0048516 A1 | 3/2006 | Tenbrock et al. |

(Continued)

FOREIGN PATENT DOCUMENTS

| | | |
|---|---|---|
| DE | 197 33 465 A1 | 2/1998 |
| DE | 101 48 424 A1 | 7/2002 |

(Continued)

OTHER PUBLICATIONS

German Search Report for corresponding German Application No. 10 2009 046 367.4.

*Primary Examiner* — Huan Le
(74) *Attorney, Agent, or Firm* — Davis & Bujold, P.L.L.C.; Michael J. Bujold

(57) ABSTRACT

A method of actuating a starting process, in a selected driving direction, of a vehicle having a hybrid drive system and a hydraulically controlled transmission. When starting, the method checks whether the vehicle is moving in the selected direction, and if the vehicle is moving in the opposite direction, at least the shifting element (A, B, D, E, F) of the transmission that is involved in the engaged gear is actuated in such a manner that a continuous torque increase is produced by the electric machine (EM).

9 Claims, 1 Drawing Sheet

(51) Int. Cl.
  *B60K 6/48* (2007.10)
  *B60W 30/18* (2012.01)
  *B60L 1/00* (2006.01)
  *B60L 11/12* (2006.01)
  *B60L 11/14* (2006.01)
  *B60L 15/20* (2006.01)
  *B60W 20/00* (2006.01)

(52) U.S. Cl.
  CPC ...... *B60L2240/461* (2013.01); *B60L 2240/486* (2013.01); *B60L 2260/22* (2013.01); *B60L 2270/145* (2013.01); *B60W 20/00* (2013.01); *B60W 2710/105* (2013.01); *Y02T 10/6217* (2013.01); *Y02T 10/6221* (2013.01); *Y02T 10/642* (2013.01); *Y02T 10/7077* (2013.01); *Y02T 10/7241* (2013.01); *Y02T 10/7275* (2013.01); *Y10T 477/347* (2015.01)

(56) References Cited

U.S. PATENT DOCUMENTS

| | | |
|---|---|---|
| 2007/0168103 A1 | 7/2007 | Scelers |
| 2009/0093337 A1* | 4/2009 | Soliman et al. ................... 477/5 |
| 2009/0143189 A1 | 6/2009 | Hasegawa et al. |
| 2011/0039655 A1 | 2/2011 | Kaltenbach et al. |
| 2011/0048822 A1 | 3/2011 | Kaltenbach et al. |
| 2011/0166727 A1* | 7/2011 | Light et al. ...................... 701/22 |

FOREIGN PATENT DOCUMENTS

| | | |
|---|---|---|
| DE | 102 21 835 A1 | 12/2003 |
| DE | 10 2004 043 587 A1 | 3/2006 |
| DE | 10 2007 055 787 A1 | 6/2009 |
| DE | 10 2008 044 248 A1 | 6/2009 |
| DE | 10 2008 001 278 A1 | 10/2009 |
| GB | 2 452 136 A | 2/2009 |

* cited by examiner

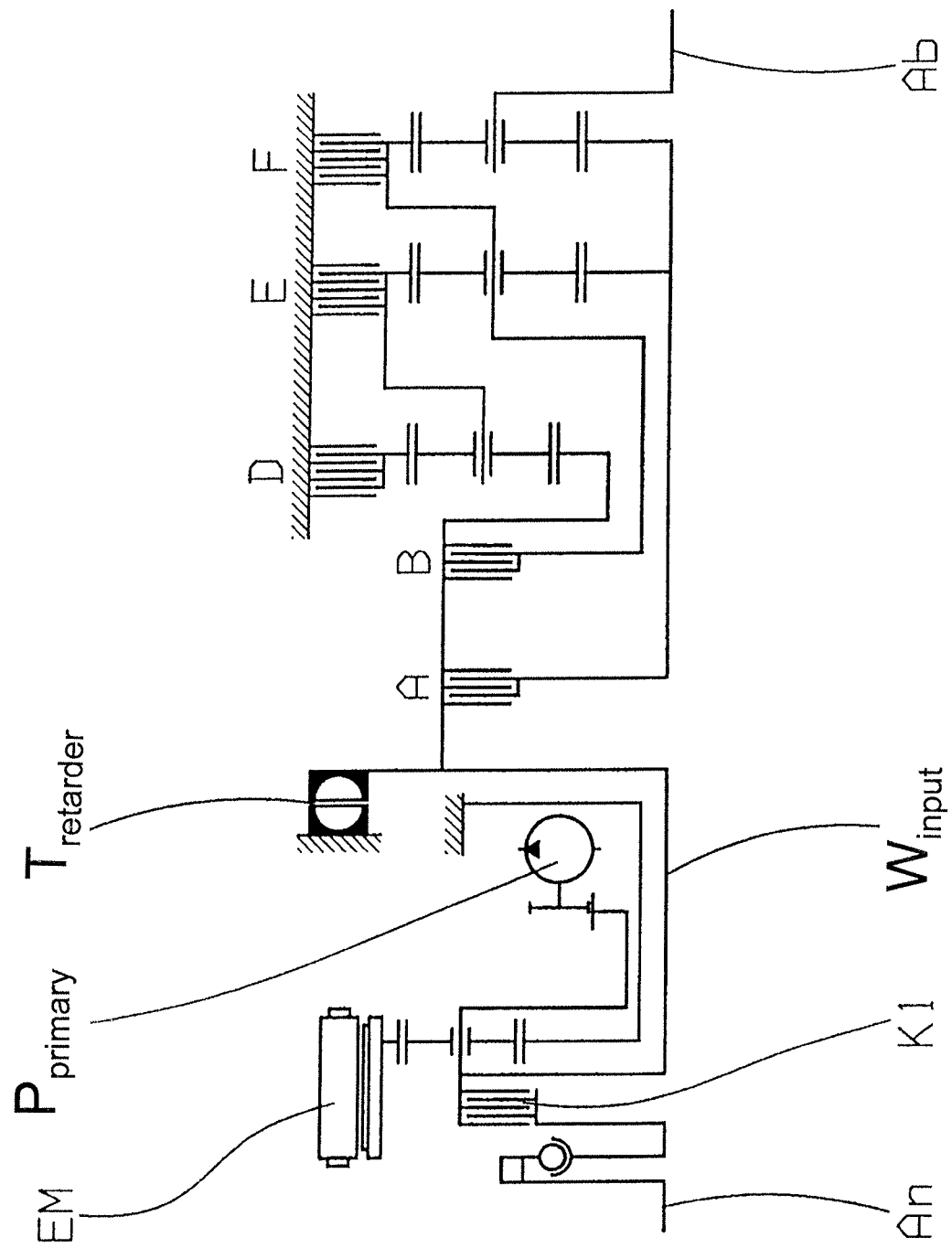

METHOD FOR ACTUATING A STARTING PROCESS

This application is a National Stage completion of PCT/EP2010/066427 filed Oct. 29, 2010, which claims priority from German patent application serial no. 10 2009 046 367.4 filed Nov. 4, 2006.

FIELD OF THE INVENTION

The present invention concerns a method for actuating a starting process in a vehicle.

BACKGROUND OF THE INVENTION

From automotive technology, vehicles with a hybrid drive and with hydraulic transmission control are known. In such drive-trains a primary transmission pump is usually provided for supplying pressure medium. However, when the internal combustion engine is switched off and the drive is purely electric, the primary pump cannot build up the necessary pressure to start because from rest the electric machine requires maximum torque for starting. Accordingly it is known to use an auxiliary electric pump, which provides the shifting elements with the pressure needed for torque transmission.

During starting processes for example on an uphill gradient, the vehicle can roll backward. However, when rolling backward the primary pump, which is connected to the transmission input shaft, rotates in the wrong direction and so draws pressure medium out of the transmission control system and delivers it back into the pressure medium sump. In this situation even the auxiliary electric pump can no longer supply enough oil since the quantity returned by the primary pump is too large. Consequently, the system pressure in the transmission control system collapses and the shifting elements can no longer transmit torque, so they operate in a slipping mode. This uncontrolled slipping operation increases the stress on the shifting elements and results in oscillations in the drive-train and in undesired bucking of the vehicle.

In the case of hybrid vehicles, rolling of the vehicle backwards can be counteracted with the help of the electric machine. However, it should be noted that at rest, in the case of synchronous machines, the rotating field is static and the power electronics system is therefore exposed to high current loads. With synchronous machines, it is true that this effect is somewhat less pronounced since even at rest a rotating field is produced by virtue of the slipping. However, this electrical prevention of rolling back by maximum torque is subject to severe time limitation. Furthermore, the use of the short-circuit torque at very low rotational speeds is critical since this can fall abruptly and the vehicle then moves backward without any braking.

SUMMARY OF THE INVENTION

The purpose of the present invention is to propose a method of the type mentioned at the beginning, which reliably prevents a vehicle, when started, from moving off in an undesired direction.

Thus, a method is proposed for controlling a starting process, in a selected driving direction, of a vehicle with a hybrid drive and a hydraulically controlled transmission, wherein on starting, it is first checked whether the vehicle is moving in the chosen direction and, if the vehicle is moving in the opposite direction, at least one shifting element of the transmission that is involved in shifting the gear engaged is controlled in such manner that by means of the electric machine a continuous torque increase is produced.

Accordingly, by virtue of the method a function for preventing the rolling back of a vehicle having a hybrid drive and a hydraulically controlled transmission is provided, such that when starting for example on an uphill gradient, movement of the vehicle in an undesired driving direction is prevented by a continuous torque increase. This prevents the constant, or primary pump from rotating in an undesired direction and thus diverting pressure medium back into the pressure medium sump. Thus, in the situation described earlier, by virtue of the method according to the invention, the vehicle behaves as a conventional vehicle, for example with an automatic converter.

To recognize whether the vehicle is moving in the desired direction, in the method signals from at least one of the following sensors or rotational speed detectors can be used, namely for example an ABS sensor, a drive output sensor, an electric machine rotor position sensor, a drive output sensor, or a turbine or drive output speed sensor or the like.

According to the invention it can be provided that at least in one of the shifting elements involved a predetermined slipping torque or sliding torque is set, such that the value of the slipping torque chosen is smaller that the maximum possible torque of the electric machine. As soon as the set slipping torque is reached, the electric machine is switched to a rotational speed mode in which the electric machine regulates the torque in such manner that a set speed specification is met.

In a related feature of the invention, the method can provide that in the rotational speed mode a torque is set at the electric machine which, for example, is higher than or equal to the slipping torque set at the shifting element that is involved in shifting the gear engaged. In this way the shifting element or shifting elements spin and the electric machine reaches the target speed. At the shifting element, a corresponding relative speed is produced. This ensures that the transmission input shaft is moving in consort with the desired driving direction by virtue of the speed specification at the electric machine, so that the primary pump delivers the necessary pressure medium or oil in the correct direction to ensure the supply of pressure medium to the transmission system.

Preferably, the volume flow provided by the primary pump and preferably also by the auxiliary electric pump can be used for cooling and lubricating the shifting elements. By virtue of the speed specification at the electric machine the quantity delivered by the primary pump can also be adjusted.

The method proposed according to the invention can preferably be used with a parallel hybrid drive system such as the ECOLIFE hybrid by the present applicant. Thus, the method is preferably used in a vehicle with an electric machine arranged in the drive-train parallel to the internal combustion engine, at least one primary pump and a primary retarder, and with a three-stage planetary gearset transmission having five shifting elements. However, other applications can also be envisaged.

BRIEF DESCRIPTION OF THE DRAWINGS

Below, the present invention is explained in more detail with reference to the attached drawing. The sole FIGURE illustrating the invention shows an example of a parallel hybrid drive system for a vehicle in which the method proposed according to the invention can preferably be used.

DETAILED DESCRIPTION OF THE PREFERRED EMBODIMENTS

The example drive-train shown comprises a parallel drive system of a vehicle having a drive input shaft An coupled by way of a clutch K1 to the transmission input shaft $w_{input}$, which is driven by an internal combustion engine. Arranged parallel to the internal combustion engine in the drive-train is an electric machine EM, this electric machine EM being connected to the transmission input shaft $w_{input}$. For the supply of pressure medium or oil, a primary pump $P_{primary}$ is also connected to the transmission input shaft $w_{input}$.

The transmission is represented schematically as a three-stage planetary gearset transmission having at least six forward gears 1, 2, 3, 4, 5, 6 and a reverse gear R. To shift the gears 1, 2, 3, 4, 5, 6, R of the transmission, five shifting elements A, B, D, E, F are provided, the shifting elements A, B, D, E, F being represented for example as disk clutches or disk brakes. To obtain the respective gears 1, 2, 3, 4, 5, 6, R, in each case two of the shifting elements A, B, D, E, F have to be actuated. For example, to engage the first gear 1 the shifting elements A and F have to be actuated. To transmit torque between the drive input shaft An and the drive output shaft Ab, a primary retarder $T_{retarder}$ is provided on the transmission input shaft $w_{input}$.

According to the invention, it is provided that in the method for controlling a starting process in a selected driving direction, when starting it is first checked whether the vehicle is moving in the selected direction. If the vehicle is not moving in the selected direction, at the shifting elements A, B, D, E, F involved in shifting the gear 1, 2, 3, 4, 5, 6, R engaged, for example for the first forward gear 1 at the shifting elements A and F, a specific slipping torque is set, whose value is smaller than the maximum possible torque of the electric machine EM. The electric machine EM is then switched to a rotational speed mode such that in the rotational speed mode a desired rotational speed specification is set at the electric machine EM, which is larger than or equal to the slipping torque at the shifting elements A and F. When the method according to the invention is used for starting in the reverse gear R, the specific slipping torque can be set for example at the shifting elements D and F. Analogously, the method can also be used for the other gears 2, 3, 4, 5, 6.

By virtue of the set slipping torque and due to the rotational speed specification at the electric machine EM, the corresponding shifting elements A, B, D, E, F, such as the shifting elements A and F for the first forward gear 1, spin and the electric machine EM reaches its target speed. This produces at the shifting elements A and F a corresponding relative speed which ensures that by virtue of the speed specification at the electric machine EM, the transmission input shaft $w_{input}$ rotates in the correct direction so that the primary pump $P_{primary}$ ensures a sufficient supply of pressure medium or oil.

INDEXES

An Drive input shaft
$W_{input}$ Transmission input shaft
EM Electric machine
$P_{primary}$ Primary pump
$T_{retarder}$ Primary retarder
Ab Drive output shaft
A Shifting element
B Shifting element
D Shifting element
E Shifting element
F Shifting element
K1 Clutch
1 First forward gear
2 Second forward gear
3 Third forward gear
4 Fourth forward gear
5 Fifth forward gear
6 Sixth forward gear
R Reverse gear

The invention claimed is:

1. A method of controlling a starting process, in a selected driving direction, of a vehicle having a hybrid drive system and a hydraulically controlled transmission, the method comprising the steps of:
   checking whether the vehicle, upon starting the vehicle in the selected driving direction, is moving in the selected driving direction, and
   if the vehicle is moving in an opposite direction that is opposite the selected driving direction, actuating at least one of a plurality of shifting elements (A, B, D, E, F) of the transmission, that are involved in an engaged gear, in such a manner that a continuous torque increase is produced by an electric machine (EM) and such that a torque transmission capacity of the at least one of the plurality of shifting elements, that are involved in the engaged gear, is reduced.

2. The method according to claim 1, further comprising the step of setting the at least one of the plurality of shifting elements (A, B, D, E, F) involved so as to have a predetermined slipping torque such that a value of the slipping torque chosen is smaller than a maximum possible torque of the electric machine (EM).

3. The method according to claim 1, further comprising the step of using the method in a vehicle having a parallel hybrid drive system and a primary retarder ($T_{retarder}$) and comprising a three-stage planetary gearset transmission having five shifting elements (A, B, D, E, F).

4. The method according to claim 1, further comprising the step of cooling and lubricating the shifting elements (A, B, D, E, F) with a volume flow delivered by a primary pump ($P_{primär}$) which is connected to a transmission input shaft that is connected to the electric machine.

5. The method according to claim 4, further comprising the step of adjusting a quantity of fluid delivered by the primary pump ($P_{primär}$) by virtue of a speed specification at the electric machine (EM).

6. A method of controlling a starting process, in a selected driving direction, of a vehicle having a hybrid drive system and a hydraulically controlled transmission, the method comprising the steps of:
   checking whether the vehicle, upon starting tide vehicle in the selected driving direction, is moving in selected direction, and
   if the vehicle is moving in an opposite direction, actuating at least one of a plurality of shifting elements (A, B, D, E, F) of the transmission, that are involved in an engaged gear, in such a manner that a continuous torque increase is produced by a electric machine (EM):
   setting the at least one of the plurality of shifting elements (A, B, D, E, F) involved so as to have a predetermined slipping torque such that a value of the slipping torque chosen is smaller than a maximum possible torque of the electric machine (EM); and
   switching the electric machine (EM) to a rotational speed mode after a specific slipping torque has been set.

7. The method according to claim 6, further comprising the step of building up a torque with the electric machine (EM) in the rotational speed mode, which is at least equal to or larger than the specific slipping torque set at the shifting elements (A, B, D, E, F) involved in shifting the gear (1, 2, 3, 4, 5, 6, R) concerned.

8. A method of controlling starting of a vehicle in a selected driving direction having a hybrid drive system and a hydraulically controlled transmission, the method comprising the steps of:
- starting driving in a selected driving direction by engaging a desired gear by actuation of at least one transmission shifting element;
- determining if the vehicle is moving in the selected driving direction, and
- if the vehicle is moving in a direction opposite the selected driving direction, setting a slipping torque at the at least one transmission shifting element (A, B, D, E, F) to reduce torque transmission capacity of the at least one transmission shifting element such that a continuous torque increase is produced by an electric machine (EM) of the hybrid drive system.

9. The method according to claim 8, wherein the electric machine is connected to a transmission input shaft and primary pump which supplies a pressure medium to transmission, the method further comprising the step of:
- increasing torque at the electric machine such that the input shaft rotates in a direction that enables the primary pump to supply the pressure medium to the transmission.

* * * * *